US008355110B2

(12) United States Patent  
Kim et al.

(10) Patent No.: US 8,355,110 B2  
(45) Date of Patent: Jan. 15, 2013

(54) METHOD FOR MANUFACTURING A LIQUID CRYSTAL DISPLAY PANEL AND LIQUID CRYSTAL DISPLAY PANEL (75) Inventors: Min-Hee Kim, Ansan-si (KR); Dong-Gi Seong, Seongnam-si (KR); Min-Goo Seok, Yongin-si (KR); Jae-Jin Lyu, Yongin-si (KR); Seung-Beom Park, Seoul (KR)

(73) Assignee: Samsung Display Co., Ltd. (KR)

( * ) Notice: Subject to any disclaimer, the term of this patent is extended or adjusted under 35 U.S.C. 154(b) by 320 days.

(21) Appl. No.: 12/623,790

(22) Filed: Nov. 23, 2009

(65) Prior Publication Data  
US 2010/0304015 A1 Dec. 2, 2010

(30) Foreign Application Priority Data  
Jun. 1, 2009 (KR) ........................ 10-2009-0047958

(51) Int. Cl.  
G02F 1/1337 (2006.01)  
G02F 1/1343 (2006.01)  
C09K 19/02 (2006.01)  
C09K 19/38 (2006.01)

(52) U.S. Cl. ........ 349/183; 349/123; 349/132; 349/139; 252/299.01; 428/1.2; 428/1.3

(58) Field of Classification Search ............ 252/299.01, 252/299.66, 299.67; 349/183, 123, 132, 349/139, 182; 428/1.1, 1.2, 1.3  
See application file for complete search history.

(56) References Cited

U.S. PATENT DOCUMENTS  
7,867,580 B2 * 1/2011 Sawatari et al. ............... 428/1.1  
7,907,247 B2 * 3/2011 Okabe et al. .................. 349/172

2004/0080685 A1 * 4/2004 Yamada et al. ............... 349/113  
2005/0116200 A1 * 6/2005 Nakanishi et al. ........ 252/299.01  
2008/0124493 A1 * 5/2008 Sawatari et al. ............... 428/1.2

* cited by examiner

Primary Examiner — Shean C Wu  
(74) Attorney, Agent, or Firm — Cantor Colburn LLP

(57) ABSTRACT

A method for manufacturing a liquid crystal display panel by providing a first substrate and providing a first alignment film, providing a second substrate and providing a second alignment film; interposing a liquid crystal compound and at least two reactive mesogens between the first and second substrates, where the two reactive mesogens are selected from Chemical Formulas 1 and 2; curing the reactive mesogens to form a first mesogen layer; and a second mesogen layer, wherein

Chemical Formula 1

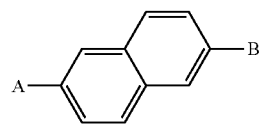

wherein in Chemical Formula 1 A and B are each independently selected from the group consisting of

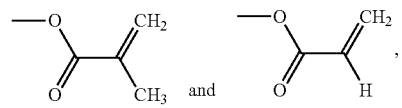

and wherein at least one hydrogen atom of a naphthalene group is independently replaced with at least one of F and Cl and

Chemical Formula 2 wherein in Chemical Formula 2, D is selected from at least one of and a single bond, wherein E and G are each independently selected from at least one of and wherein at least one hydrogen atom of a phenyl group are independently replaced with at least one of F and Cl.

14 Claims, 2 Drawing Sheets

METHOD FOR MANUFACTURING A LIQUID CRYSTAL DISPLAY PANEL AND LIQUID CRYSTAL DISPLAY PANEL

This application claims priority to Korean Patent Application No. 2009-47958, filed on Jun. 1, 2009, and all the benefit accruing therefrom under 35 U.S.C. §119, the content of which in its entirety is herein incorporated by reference.

BACKGROUND OF THE INVENTION

1. Field of the Invention

Exemplary embodiments relate to a method for manufacturing a liquid crystal display ("LCD") panel and an LCD panel. More particularly, exemplary embodiments relate to a method for manufacturing an LCD panel and a LCD panel having an improved productivity.

2. Description of the Related Art

Generally, a typical LCD device displays a picture via a method for controlling light transmittance by applying a voltage to electrodes to generate an electromagnetic field across a layer of liquid crystal material. According to a patterned vertical alignment ("PVA") mode, which is one type of vertical alignment ("VA") mode for a LCD device, liquid crystal compounds are arranged in different directions by a patterned transparent electrode to form a liquid crystal domain, thereby increasing the viewing angle of the LCD device.

Recently, a method of pretilting a portion of the liquid crystal compounds by using a light reactive monomer, which has similar characteristics to light reactive monomers typically used in conventional liquid crystal compounds and which is called a reactive mesogen ("RM"), is used for improving the alignment reliability of the liquid crystal compounds. In a process for manufacturing the LCD device, when the RM is not cured and remains in the liquid crystal layer, afterimages may occur in the LCD device, thereby deteriorating the display quality. To address this problem, the energy provided to, or the exposure time of a curing process for, the light reactive monomer may be increased. In addition, the curing time for the RM may be decreased when using a RM having a high light reaction speed.

However, when the energy provided to the curing process is increased by increasing the illumination intensity of a light source, power consumption and manufacturing costs associated with the LCD may also increase. Furthermore, the display quality may deteriorate as the liquid crystal compounds and/or the alignment film may be damaged by the increased illumination intensity. Moreover, when the exposure time is increased, productivity may deteriorate as the time required for the manufacturing process of the LCD device is increased. The curing time for the RM may be decreased by using a RM having a high light reaction speed. However, exposure stains may be generated by partial curing of the RM when the RM is loaded.

BRIEF SUMMARY OF THE INVENTION

Exemplary embodiments of the present invention provide a method for manufacturing a liquid crystal display ("LCD") panel having a decreased process time and minimizing the generation of exposure stains by a reactive mesogen.

Exemplary embodiments of the present invention also provide an LCD panel having an improved display quality.

According to one exemplary embodiment of the present invention, there is provided a method for manufacturing an LCD panel, the method including providing a first substrate and a second substrate. The first substrate includes a pixel electrode electrically connected to a switching element arranged in a pixel area of a first base substrate and disposing a first alignment film on the pixel electrode. The second substrate includes a common electrode layer disposed on a second base substrate and disposing a second alignment film on the common electrode layer, wherein the second substrate is disposed substantially opposite the first substrate. A liquid crystal compound and at least two reactive mesogens are interposed between the first and second substrates. The at least two reactive mesogens are selected from the group consisting of compounds represented by at least one of the following Chemical Formulas 1 and/or 2. The method further includes curing the reactive mesogens on the first alignment film to form a first mesogen layer and curing the reactive mesogens on the second alignment film to form a second mesogen layer.

Chemical Formula 1 wherein in Chemical Formula 1 A and B are each independently selected from the group consisting of and wherein at least one hydrogen atom of a naphthalene group is independently replaced with at least one of F and Cl and Chemical Formula 2 wherein in Chemical Formula 2, D is selected from at least one of

M and a single bond, wherein E and G are each independently selected from
at least one of and wherein at least one hydrogen atom of a phenyl group are independently replaced with at least one of F and Cl.

According to another exemplary embodiment a voltage is applied between the first substrate and the second substrate after interposing the liquid crystal compound between the first substrate and the second substrate. Light is provided to the first substrate and the second substrate while the voltage is applied.

In another exemplary embodiment the reactive mesogens further include a first compound having a first light reaction speed and a second compound having a second light reaction speed, wherein the second light reaction speed is relatively slower than the first light reaction speed. In an exemplary embodiment, a weight ratio of the first compound to the second compound in the liquid crystal composition is about 20:80 to about 70:30 based on the total weight of the reactive mesogens.

According to another exemplary embodiment of the invention, an LCD panel includes a first substrate, a second substrate and a liquid crystal layer. The first substrate includes a pixel electrode electrically connected to a switching element arranged in a pixel area of a first base substrate, a first alignment film disposed on the pixel electrode and a first mesogen layer formed on the first alignment film. The second substrate includes a common electrode layer facing the first substrate and disposed on the second base substrate, a second alignment film formed on the common electrode layer and a second mesogen layer formed on the second alignment film. The liquid crystal layer is interposed between the first substrate and the second substrate and includes a liquid crystal compound. In addition, each of the first mesogen layer and the second mesogen layer include a lower cured layer and an upper cured layer. The lower cured layer is formed by polymerizing a first compound selected from the group consisting of compounds represented by at least one of the following Chemical Formulas 1 and 2. The upper cured layer is formed by polymerizing a second compound selected from the group consisting of compounds represented by at least one of the above Chemical Formulas 1 and 2, the second compound being different from the first compound.

According to exemplary embodiments of the present invention, by using a mixture of reactive mesogens having different light reactive speeds, the light reaction speed of the entire composition of the reactive mesogens may be optimized. Thus, the curing time may be decreased and the generation of exposure stains may be prevented without increasing the illumination intensity or the exposure time so that the productivity and display quality of the LCD panel may be improved.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

The present invention now will be described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be explained in detail with reference to the accompanying drawings.

Figure 1:
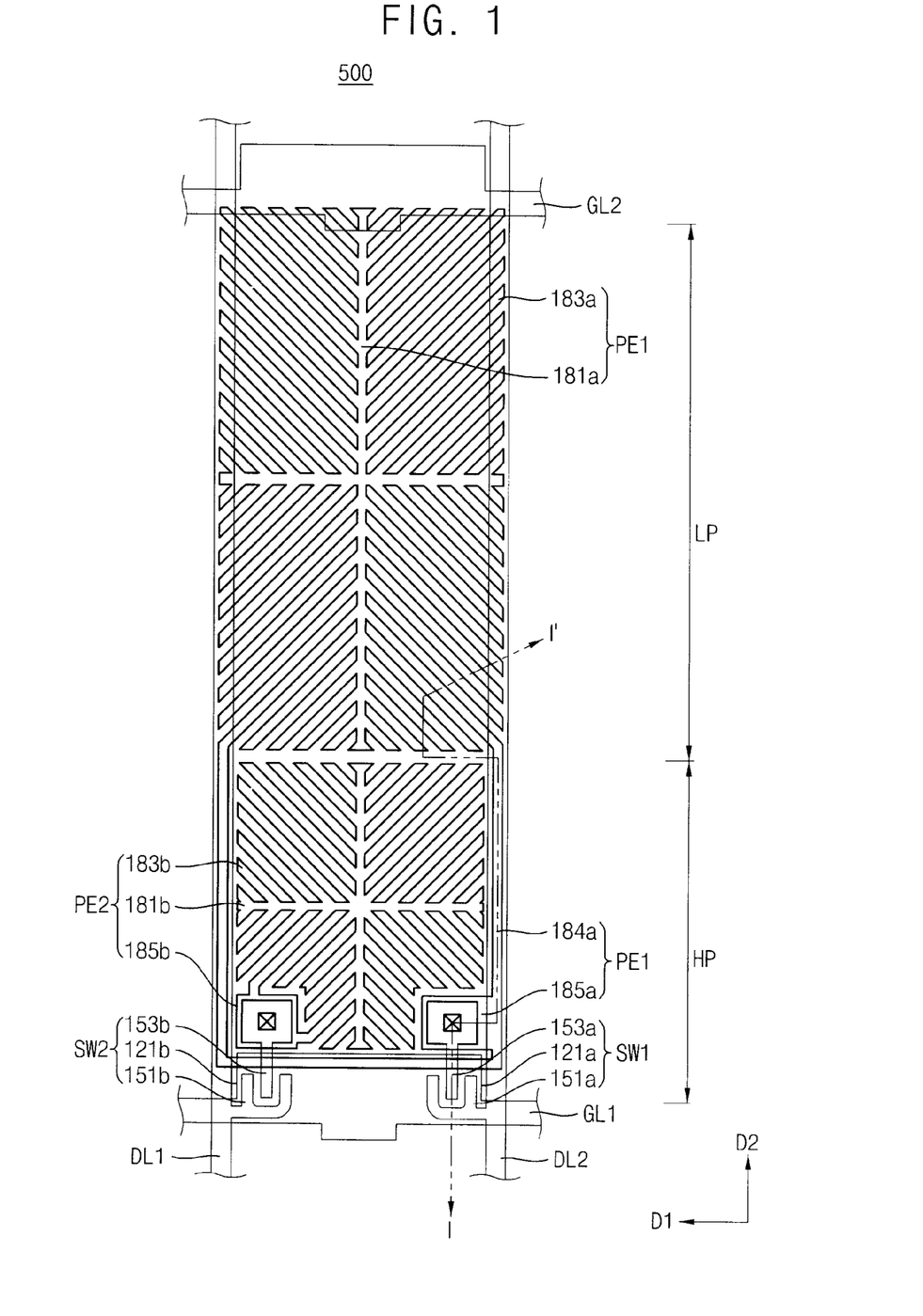
FIG. 1 is a top plan view illustrating an exemplary embodiment of a liquid crystal display ("LCD") panel according to the present invention.

FIG. 1 is a top plan view illustrating an exemplary embodiment of a liquid crystal display ("LCD") panel according to the present invention.

Figure 2:
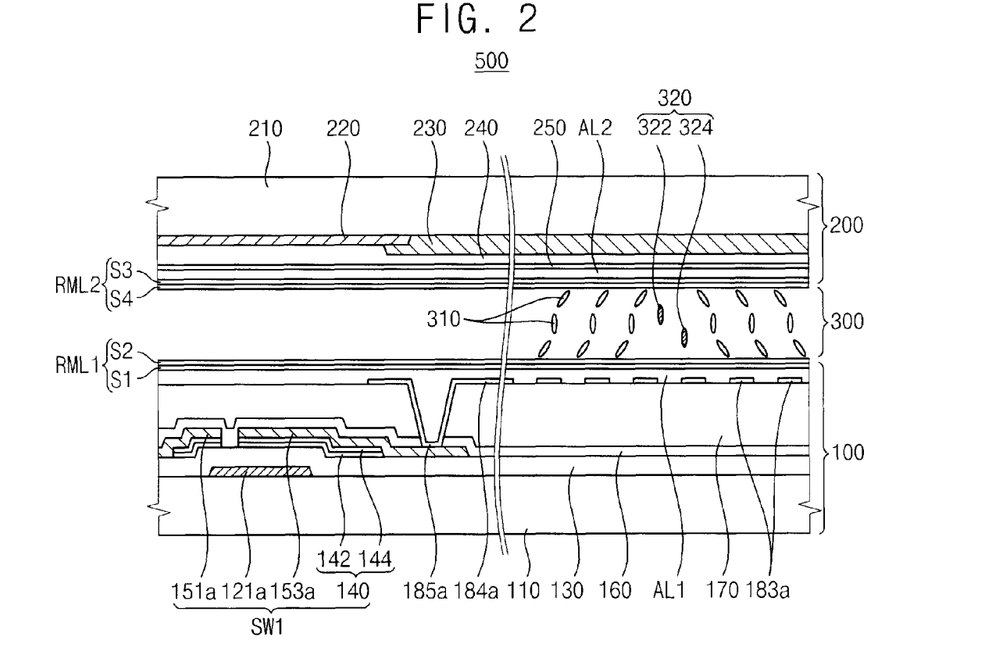
FIG. 2 is a cross-sectional view of the exemplary embodiment of FIG. 1 taken along line I-I' of the exemplary embodiment of the LCD panel of FIG. 1.

FIG. 2 is a cross-sectional view of the exemplary embodiment of FIG. 1 taken along the line I-I' of the exemplary embodiment of a LCD panel of FIG. 1.

Referring to FIGS. 1 and 2, an LCD panel 500 includes a first substrate 100, a second substrate 200 and a liquid crystal layer 300 interposed between the first and second substrates 100 and 200.

The first substrate 100 includes a first gate line GL1, a second gate line GL2, a first data line DL1, a second data line DL2, a first transistor SW1, a second transistor SW2, a first sub-electrode PE1, a second sub-electrode PE2, a first alignment film AL1 and a first mesogen layer RML1, which are formed on a first base substrate 110.

The first and second gate lines GL1 and GL2 and the first and second data lines DL1 and DL2 cross, e.g., the first and second gate lines GL1 and GL2 are disposed substantially perpendicularly to the first and second data lines DL1 and DL2, and surround one pixel area of the first substrate 100. The first and second transistors SW1 and SW2 and the first and second sub-electrodes PE1 and PE2 are formed on the pixel area. The first and second transistors SW1 and SW2 serve as switching elements to turn the pixel area on/off, and the first and second sub-electrodes PE1 and PE2 serve as pixel electrodes connected to the switching elements. The first substrate 100 may further include a gate insulation layer 130, a passivation layer 160 and an organic layer 170.

The first and second gate lines GL1 and GL2 are extended in a first direction D1 of the LCD panel 500 and may be arranged in parallel to each other along a second direction D2 which is different from the first direction D1. For example, in an exemplary embodiment the first and second directions D1 and D2 may be substantially perpendicular to each other. The first gate line GL1 is connected to the first and second transistors SW1 and SW2. The first and second data lines DL1 and DL2 are extended along the second direction D2 and arranged substantially parallel to one another along the first direction D1. In one exemplary embodiment, the first and second data lines DL1 and DL2 are disposed substantially perpendicular to the first and second gate lines GL1 and GL2.

The first transistor SW1 is connected to the first gate line GL1 and the second data line DL2. The first transistor SW1 includes a first gate electrode 121a which is connected to the first gate line GL1, a first source electrode 151a which is connected to the second data line DL2, a first drain electrode 153a which is spaced apart from the first source electrode 151a, and a first active pattern 140. The first active pattern 140 may include a semiconductor layer 142 and an ohmic contact layer 144 sequentially formed on the gate insulation layer 130. Exemplary embodiments include configurations wherein the ohmic contact layer 144 may be omitted.

The second transistor SW2 is connected to the first gate line GL1 and the first data line DL1. The second transistor SW2 includes a second gate electrode 121b which is connected to the first gate line GL1, a second source electrode 151b which is connected to the first data line DL1, a second drain electrode 153b which is spaced apart from the second source electrode 151b and a second active pattern (not illustrated).

The first sub-electrode PE1 is electrically connected to the first transistor SW1. The first sub-electrode PE1 is provided with a first voltage through the second data line DL2. The second sub-electrode PE2 is electrically connected to the second transistor SW2. The second sub-electrode PE2 is provided with a second voltage through the first data line DL1. In an exemplary embodiment, the second voltage may be higher than the first voltage. An area in which the first sub-electrode PE1 is formed may be defined as a lower pixel LP of the LCD panel 500 and an area in which the second sub-electrode PE2 is formed may be defined as a higher pixel HP of LCD panel 500. Alternative exemplary embodiments include configurations wherein the first and second sub-electrodes PE1 and PE2 may be formed to have various shapes.

The first sub-electrode PE1 includes a plurality of first microelectrodes 183a, a first contact electrode 185a which contacts the first drain electrode 153a and a bridge pattern 184a which physically and electrically connects the plurality of first microelectrodes 183a to the first contact electrode 185a. A bridge pattern 184a is formed to surround the second sub-electrode PE2. The plurality of first microelectrodes 183a may be formed to have a radial shape diverging from a first body 181a. The first body 181a having a cross-shape which extends in the first and second directions D1 and D2. The second sub-electrode PE2 includes a plurality of second microelectrodes 183b and a second contact electrode 185b which contacts with the second drain electrode 153b. The plurality of second microelectrodes 183b may be formed to have a radial shape diverging from a second body 181b having a cross-shape which extends in the first and second directions D1, D2. Alternative exemplary embodiments include configurations wherein the microelectrodes 183a and 183b have various other shapes.

The first alignment film AL1 is formed on the first base substrate 110 which includes the first and second sub-electrodes PE1 and PE2. The first alignment film AL1 may arrange liquid crystal compounds 310 of the liquid crystal layer 300 such that the liquid crystal compounds 310 are substantially perpendicular to a surface of the first substrate 100. For example, in an exemplary embodiment the first alignment film AL1 may include a polyamide compound or other similar compounds.

The first mesogen layer RML1 may be formed on the first alignment film AL1. In one exemplary embodiment the first mesogen layer RML1 may pretilt the liquid crystal compounds 310 such that the liquid crystal compounds have a pretilt angle in the vertical direction. The first mesogen layer RML1 includes a first cured layer S1 formed on the first alignment film AU and a second cured layer S2 formed on the first cured layer S1. The materials which form the second cured layer S2 have lower reaction speed than the materials which form the first cured layer S1. Accordingly, after the first cured layer S1 is formed on the first alignment film AL1 as the lower cured layer, the second cured layer S2 may be formed on the first cured layer S1 as the upper cured layer.

The second substrate 200 includes a black matrix pattern 220, a color filter 230, an overcoating layer 240, a common electrode layer 250, a second alignment layer AL2 and a second mesogen layer RML2, which are formed on a second base substrate 210 which faces the first substrate 100. The common electrode layer 250 faces the first and second sub-electrodes PE1 and PE2 and is substantially entirely formed on the surface of the second base substrate 210. Since the first and second sub-electrodes PE1 and PE2 are disposed on the first substrate 100, in one exemplary embodiment the common electrode layer 250 may control a fringe field direction without a patterning process.

The second alignment film AL2 may be formed on the common electrode layer 250 and the second mesogen layer RML2 may be formed on the second alignment film AL2. The second alignment film AL2 and the second mesogen layer RML2 are substantially similar to the first alignment film AL1 and the first mesogen layer RML1 except that they are formed on the second substrate 200. The second mesogen layer RML2 includes a third cured layer S3 formed on the second alignment layer AL2 and a fourth cured layer S4 formed on the third cured layer S3. The materials which form the third cured layer S3 have a higher reaction speed than the materials which form the fourth cured layer S4. Accordingly, after the third cured layer S3 is formed on the second alignment film AL2 as the lower cured layer, the fourth cured layer S4 may be formed on the third cured layer S3 as the upper cured layer.

The liquid crystal layer 300 includes the liquid compounds 310 and at least two kinds of reactive mesogens 320. In an exemplary embodiment the two types of reactive mesogens 320 are different from each other. In another exemplary embodiment the liquid crystal compounds 310 may include a conventional liquid crystal compound. For example, in exemplary embodiments the liquid crystal compounds may exhibit negative dielectric anisotropy. In addition, the liquid crystal compounds 310 may be aligned in a vertical direction relative to the surface of the first substrate 100 by the first and second alignment films AL1 and AL2. The liquid crystal compounds 310 may have a pretilt angle in the vertical direction, which is induced by the first and second mesogen layers RML1 and RML2.

In the process of forming the first and second mesogen layers RML1 and RML2, the reactive mesogens 320 do not react with the light and may remain in the liquid crystal layer 300. The first and second mesogen layers RML1 and RML2 include a light curing polymer which is formed by reaction of the same compounds as the reactive mesogens 320 with light.

A small amount of the reactive mesogens 320 is disposed in the liquid crystal layer 300. When the weight of the reactive mesogens 320 exceeds about 3 wt % of the liquid crystal compounds, based on the total weight of the liquid crystal compounds (i.e., the total weight of the liquid crystal compounds equals 100 wt %), the reactive mesogens 320 may cause afterimages due to curing by the light emitted from a backlight assembly arranged under the LCD panel 500 or by another externally provided light. Accordingly, it is preferable that the weight percent of the reactive mesogens 320 in the liquid crystal layer 300 be no more than about 3 wt %, based on the total weight of the liquid crystal compounds.

In exemplary embodiments, the reactive mesogens 320 may include two different kinds of compounds where a first compound 322 and a second compound 324 have different light reaction speeds from each other. In exemplary embodiments, the first and second compounds 322 and 324 may each be represented by at least one of the following Chemical Formulas 1 and 2. Furthermore, in one exemplary embodiment the first compound may be represented by the following Chemical Formula 1 and the second compound may be represented by the following Chemical Formula 2.

Chemical Formula 1 wherein in Chemical Formula 1 A and B are each independently selected from the group consisting of and wherein at least one hydrogen atom of a naphthalene group is independently replaced with at least one of F and Cl and Chemical Formula 2 wherein in Chemical Formula 2, D is selected from at least one of and a single bond, wherein E and G are each independently selected from at least one of and wherein at least one hydrogen atom of a phenyl group are independently replaced with at least one of F and Cl. The reactive mesogens 320 will be further explained with reference to FIG. 3.

A method for manufacturing the exemplary embodiment of the LCD panel illustrated in FIG. 2 will hereinafter be described with reference to FIG. 3.

Figure 3:
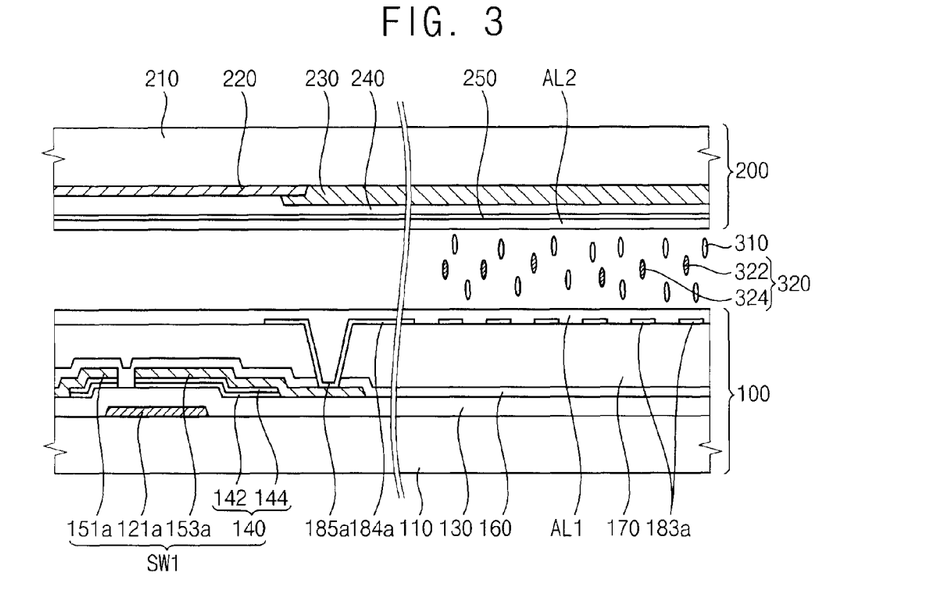
FIG. 3 is a cross-sectional view illustrating an exemplary embodiment of a method for manufacturing the exemplary embodiments of the LCD panel of FIGS. 1 and 2.

FIG. 3 is a cross-sectional view illustrating an exemplary embodiment of a method for manufacturing the exemplary embodiment of the LCD panel of FIGS. 1 and 2.

Referring to FIG. 3, a gate pattern is formed on the first base substrate 110. The gate pattern includes the first and second gate lines GL1 and GL2 and the first and second gate electrodes 121a and 121b. The gate insulation layer 130 is formed on the first base substrate 110 on which the gate pattern is formed. The first active pattern 140 and the second active pattern are formed on the gate insulation layer 130.

A source pattern is formed on the first base substrate 110 on which the first active pattern 140 and the second active pattern are formed. The source pattern includes the first and second data lines DL1 and DL2, the first and second source electrodes 151a and 151b and the first and second drain electrodes 153a and 153b. The passivation layer 160 and the organic layer 170 are sequentially formed on the first base substrate 110 on which the source pattern is formed.

The first and second sub-electrodes PE1 and PE2 are formed on the first base substrate 110, which includes the passivation layer 160 and the organic layer 170 disposed thereon. The first and second sub-electrodes PE1 and PE2 are formed on the pixel area.

The first alignment film AU is formed on the first base substrate 110 on which the first and second sub-electrodes PE1 and PE2 are formed. In an exemplary embodiment the first alignment film AL1 may be formed entirely on a surface of the first base substrate 110, e.g., the first alignment film AU may cover substantially an entire surface of the first base substrate 110.

The black matrix pattern 220 is formed on the second base substrate 210. In an exemplary embodiment the black matrix pattern 220 may be formed on the area of the second base substrate 210 which corresponds to the gate pattern and/or the source pattern.

In the present exemplary embodiment, the color filter 230 is formed on the second base substrate 210 on which the black matrix pattern 220 is formed. In an exemplary embodiment the color filter 230 may be formed on the area of the second base substrate 210, which corresponds to the pixel area. Alternative exemplary embodiments may include a color filter on array ("COA") type configuration wherein the color filter 230 is formed on the first base substrate 110.

The overcoating layer 240 is formed on the second base substrate 210, which includes the black matrix pattern 220 and the color filter 230. The common electrode 250 is formed on the second base substrate 210 on which the overcoating layer 240 is formed. In an exemplary embodiment the common electrode layer 250 may be formed entirely on the surface of the second base substrate 210 without any patterning process, e.g., the common electrode layer 250 may be formed on substantially an entire surface of the second base substrate 210.

Thereafter, the second alignment film AL2 is formed on the second base substrate 210 on which the common electrode layer 250 is formed. In an exemplary embodiment the second alignment film AL2 may be formed on substantially an entire surface of the second base substrate 210.

The first and second alignment films AL1 and AL2 are arranged to face each other by combining the first substrate 100 on which the first alignment film AL1 is formed and the second substrate 200 on which the second alignment AL2 is formed. A liquid crystal composition is interposed between the first and second substrates 100 and 200. In an exemplary embodiment the liquid crystal composition is injected between the first and second substrates 100 and 200 after combining the first and second substrates 100 and 200. In an alternative exemplary embodiment, the liquid crystal composition may be interposed between the first and second substrates 100 and 200 by combining the second substrate 200 to the first substrate 100 after loading the liquid crystal composition on the first substrate 100.

The liquid crystal composition includes the conventional liquid compounds 310 and the reactive mesogens 320. In an exemplary embodiment the reactive mesogens 320 may include the first compound 322 having a first light reaction speed and the second compound 324 having a second light reaction speed, where the second light reaction speed is relatively slower than the first light reaction speed.

For example, in an exemplary embodiment the reactive mesogens 320 may be represented by the following Chemical Formulas 3 through 18. In the following Chemical Formulas 3 through 18, when one compound is selected and defined as the "first compound 322," then the compound that is selected and defined as the "second compound 324" may be one of the remaining compounds having a light reaction speed which is relatively slower than the first light reaction speed of the first compound 322. The light reaction speed of the compound that is selected and defined as the "second compound" will be defined as the "second light reaction speed." Chemical Formulas 3 through 18 are represented by the following Chemical Formulas.

Chemical Formula 3

Chemical Formula 4

Chemical Formula 5

Chemical Formula 6

Chemical Formula 7

Chemical Formula 8

Chemical Formula 9

Chemical Formula 10

Chemical Formula 11

Chemical Formula 12

Chemical Formula 13

Chemical Formula 14

Chemical Formula 15

Chemical Formula 16

Chemical Formula 17

Chemical Formula 18

For example, in an exemplary embodiment when the compound represented by Chemical Formula 3 is selected as the first compound 322, one of the compounds represented by Chemical Formulas 4 through 18 may be selected as the second compound 324. In this exemplary embodiment the compounds represented by Chemical Formulas 4 through 18 may be selected as the second compound 324 because each of these compounds has a light reaction speed that is relatively slower than the light reaction speed of the compound represented by Chemical Formula 3. Likewise, in an alternative exemplary embodiment when the compound represented by Chemical Formula 6 is selected as the first compound 322, one of the compounds represented by Chemical Formulas 4, 5 and 7 through 16 may be selected as the second chemical compound 324 because each of these compounds has a light reaction speed that is relatively slower than the light reaction speed of the compound represented by Chemical Formula 6. In another alternative embodiment when the compound rep- resented by either of Chemical Formula 17 or 18 is selected as the first compound 322, one of the compounds represented by Chemical Formulas 4 through 16 may be selected as the second chemical compound 324.

For example, in an exemplary embodiment the first compound 322 may be represented by Chemical Formula 3 and the second compound 324 may be represented by Chemical Formula 4. Alternatively, in another exemplary embodiment the first compound 322 may be represented by Chemical Formula 3 and the second compound 324 may be represented by Chemical Formula 5. The second light reaction speed of a compound represented by Chemical Formula 5 is relatively slower than the first light reaction speed. In an alternative exemplary embodiment the first compound 322 may be represented by Chemical Formula 3 and the second compound 324 may be represented by Chemical Formula 6. A compound represented by Chemical Formula 6 has a second light reaction speed relatively slower than the first light reaction speed.

In the liquid crystal composition, a weight ratio of the first compound 322 to the second compound 324 may be about 20:80 to about 70:30 based on the total weight of the reactive mesogens 320. In one exemplary embodiment of the liquid crystal composition, when the total weight of the reactive mesogens 320 is about 100 weight percent, and the weight of the first compound 322 is less than about 20 weight percent and the weight of the second compound 324 is more than about 80 weight percent, then the light reaction speed of the entire composition of the reactive mesogens 320 depends primarily on the light reaction speed of the second compound 324. Accordingly, in this exemplary embodiment decreasing the exposure time is difficult because the contribution of the first compound 322 to the light reaction speed of the entire composition of the reactive mesogens 320 may be too small.

In an alternative exemplary embodiment of the liquid crystal composition, when the weight of the first compound is more than about 70 weight percent and the weight of the second compound 324 is less than about 30 weight percent, the light reaction speed of the entire composition of the reactive mesogens depends primarily on the light reaction speed of the first compound 322. Accordingly, in this exemplary embodiment the generation of exposure stains may not be prevented because the contribution of the second compound 324 to the light reaction speed of the entire reactive mesogens 320 may be too small.

For example, in an exemplary embodiment the liquid crystal compound 310 may be represented by the following Chemical Formulas 19 through 24. The liquid crystal compounds 310 are not limited to the following exemplary compounds.

Chemical Formula 19

Chemical Formula 20

Chemical Formula 21

In Chemical Formulas 19 through 21, the $R_1$, $R_2$, $R_3$, $R_4$, $R_5$ and $R_6$ each independently represents an alkyl group of 1 to 12 carbon atoms. A —$CH_2$— group of $R_1$ to $R_6$ may be independently replaced with —O—, —CH=CH—, —CO—, —OCO— or —COO—.

Chemical Formula 22

Chemical Formula 23

Chemical Formula 24

In Chemical Formulas 22 through 24, the R7, R8, R9, R10, R11 and R12 each independently represents an alkyl group of 1 to 12 carbon atoms. A —$CH_2$— group of R7 to R12 may be independently replaced with —O—, —CH=CH—, —CO—, —OCO— or —COO—.

Thereafter, a voltage is applied between the first and second substrate 100 and 200 to form a fringe field, so that the liquid crystal compounds 310 and the reactive mesogens 320 are tilted. While the fringe field is formed, light is irradiated on the first and second substrates 100 and 200. For example, in an exemplary embodiment the light may be an ultraviolet ("UV") light or other similar light source. The reactive mesogens 320 are polymerized by the light to be cured. During the irradiating process, as the fringe field is formed between the first and second substrates 100 and 200, the liquid crystal compounds 310 may maintain a tilted state.

In an exemplary embodiment, when the second compound 324 includes at least one of the compounds represented by Chemical Formulas 5 and 7 through 16 and when the light is irradiated on the first and second substrate 100 and 200 while the fringe field is formed between the first and second substrates 100 and 200, the second compound 234 may easily move towards the first substrate 100 and/or the second substrate 200. In contrast, in another exemplary embodiment the first compound 322 may be arranged adjacent to a central region between the first and second substrates 100 and 200 compared to the second compound 324. Accordingly, the second compound 324 having a slower light reaction speed is more directly provided with the light compared to the first compound 322 and the first compound 322 having a faster light reaction speed is provided with a shield effect by the second compound 324. Therefore, the light reaction speed of the entire composition of the reactive mesogens 320 may be between the light reaction speeds of the first and second compounds 322 and 324.

For example, in an exemplary embodiment the compounds represented by Chemical Formulas 5, 7 and 9 through 16 may easily move toward the first substrate 100 and/or the second substrate 200 while being positioned vertical or horizontal to the fringe field lines. Additionally, in an exemplary embodiment a compound represented by Chemical Formula 8 may easily move toward the first substrate 100 and/or the second substrate 200 because an alkenyl side chain connected to a phenyl group reacts with an end of the first alignment film AL1 and/or the second alignment film AL2.

In contrast, in another exemplary embodiment when a compound represented by Chemical Formula 4 is the second compound 324, the light reaction speed of the second compound 324 is excessively slow so that the light reaction speed of the entire composition of the reactive mesogens 320 is slower than the light reaction speed of the second compound 324.

After irradiating the light, the first mesogen layer RML1 is formed on the first substrate 100 and the second mesogen layer RML2 is formed on the second substrate 200. The first mesogen layer RML1 is formed on the first alignment film AL1 and the second mesogen layer RML2 is formed on the second alignment film AL2. More specifically, in one exemplary embodiment after irradiating the light, the first compound 322 having a relatively fast light reaction speed is cured adjacent to the first and second alignment films AL1 and AL2 so that the first and third cured layers S1 and S3 are formed. Then, after a predetermined time period, the second compound 324 having a relatively slow light reaction speed is cured in a region adjacent to the first and third alignment films AU and AL3 the second cured layer S2 is formed on the first cured layer S1 and the fourth cured layer S4 is formed on the third cured layer S3.

In one exemplary embodiment the first and second mesogen layers RML1 and RML2 may also tilt the liquid crystal compounds 310. Therefore, although the fringe field is not formed between the first and second substrates 100 and 200, the liquid crystal compounds 310 may be maintained at a tilt by the first and second mesogen layers RML1 and RML2.

For example, in an exemplary embodiment a weight ratio of the first compound 322 to the second compound 324 may be about 33:67 based on the total weight of the reactive mesogens. In alternative exemplary embodiments the weight ratio of the first compound 322 to the second compound 324 may be about 50:50 or about 67:33.

For example, in one exemplary embodiment when the first compound 322 is represented by Chemical Formula 3 and when the second compound 324 is represented by Chemical Formula 4, the exposure time for the weight ratio of about 33:67 is defined as about 1, the exposure time for the weight ratio of about 50:50 may be about 0.9 and the exposure time for the weight ratio of 67:33 is about 0.75. In this exemplary embodiment, the exposure stains caused by the reactive mesogens 320 may be reduced or effectively prevented.

For example, in another exemplary embodiment the first compound 322 may be represented by Chemical Formula 3 and the second compound 324 may be represented by Chemical Formula 5 and the weight ratio of the first compound 322 to the second compound 324 may be about 50:50 based on the total weight of the reactive mesogens 320. When the exposure time is defined as about 1 when the weight ratio of compounds represented by Chemical Formulas 3 and 5 is about 33:67, the exposure time for a composition including the compounds represented by the Chemical Formulas 3 and 5, of which the weight ratio is about 50:50, is about 0.27. In this exemplary embodiment, the exposure stains caused by the reactive mesogens 320 may not be generated.

For example, in an alternative exemplary embodiment the first compound 322 may be represented by Chemical Formula 3 and the second compound 324 may be represented by Chemical Formula 6 and the weight ratio of the first compound 322 to the second compound 324 may be about 50:50 based on the total weight of the reactive mesogens 320. When the exposure time is defined as about 1 when the weight ratio of compounds represented by Chemical Formulas 3 and 6 is 33:67, the exposure time for a composition including the compounds represented by Chemical Formulas 3 and 6, of which the weight ratio is about 50:50, is about 0.20. In this exemplary embodiment, the exposure stains caused by the reactive mesogens 320 may not be generated.

According to an exemplary embodiment of the present invention, by using a mixture of the reactive mesogens 320 having different light reaction speeds from each other and the liquid crystal composition, the time for forming the first and second mesogen layers RML1 and RML2 may be decreased compared to using only the second compound 324. Since the time for forming the first and second mesogen layers RML1 and RML2 is proportional to the exposure time for which the light is irradiated and to the curing time for which the reactive mesogens 320 are cured, the time for forming the first and second mesogen layers RML1 and RML2 may be decreased, thereby decreasing the manufacturing time for the LCD panel 500.

Additionally, since the second compound 324 shields the first compound 322 from a fast reaction with the UV light, the curing speed of the entire composition of the reactive mesogens 320 may be controlled and the generation of exposure stains in a process for forming the first and second mesogen layers RML1 and RML2 may be prevented. Furthermore, in exemplary embodiments, even though no less than two kinds of the reactive mesogens 320 are mixed and used, the reaction speed of the liquid crystal compounds 310 may not be affected and may be substantially the same as when only one kind of reactive mesogen is used.

Although not illustrated in figures, in exemplary embodiments the color filter 230 and/or the black matrix pattern 220 of the second substrate 202 illustrated in FIG. 2 may be formed on the first substrate 102. Accordingly, the color filter 230 may be formed under the first and second sub-electrodes PE1 and PE2, e.g., in a COA configuration as described briefly above. Also, the black matrix pattern 220 may be formed on the first base substrate 110 corresponding to the first and second gate lines GL1 and GL2, the first and second data lines DL1 and DL2 and the first and second transistors SW1 and SW2 of the first substrate 102. In addition, the common electrode layer 260, the second alignment film AL2 and the second reactive mesogen layer RML2 may be formed on the second base substrate 210.

According to the present invention, by using a mixture of reactive mesogens having different light reaction speeds from each other, the light reaction speed of the entire composition of the reactive mesogens may be optimized. Thus, the curing time may be decreased and the generation of exposure stains may be prevented without increasing the illumination intensity or exposure time so that the productivity and display quality of the LCD panel may be improved.

The foregoing is illustrative of the present invention and is not to be construed as limiting thereof. Although a few exemplary embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A method for manufacturing a liquid crystal display panel, comprising:
   providing a first substrate which includes a pixel electrode electrically connected to a switching element arranged in a pixel area of a first base substrate and a first alignment film disposed on the pixel electrode;
   providing a second substrate which includes a common electrode layer disposed thereon and a second alignment film disposed on the common electrode layer, the second substrate being disposed substantially opposite to the first substrate;
   interposing a liquid crystal compound and at least two reactive mesogens between the first substrate and the second substrate, wherein the at least two reactive mesogens are selected from the group consisting of compounds represented by at least one of the following Chemical Formulas 1 and 2;
   curing the reactive mesogens on the first alignment film to form a first mesogen layer; and
   curing the reactive mesogens on the second alignment film to form a second mesogen layer, wherein Chemical Formula 1 wherein in Chemical Formula 1 A and B are each independently selected from the group consisting of wherein at least one hydrogen atom of a naphthalene group is independently replaceable with at least one of F and Cl; and Chemical Formula 2 wherein in Chemical Formula 2, D is selected from at least one of and a single bond, wherein E and G are each independently selected from at least one of and wherein at least one hydrogen atom of a phenyl group are independently replaceable with at least one of F and Cl.

2. The method of claim 1, further comprising:
   applying a voltage between the first substrate and the second substrate after interposing the liquid crystal compound between the first substrate and the second substrate; and
   providing a light to the first substrate and the second substrate while the voltage is applied.

3. The method of claim 1, wherein the reactive mesogens, further include:
   a first compound having a first light reaction speed; and
   a second compound having a second light reaction speed, wherein the second light reaction speed is relatively slower than the first light reaction speed.

4. The method of claim 3, wherein forming the first mesogen layer further includes:
   curing the first compound disposed on the first alignment film to form a first cured layer; and
   curing the second compound disposed on the first cured layer to form a second cured layer.

5. The method of claim 4, wherein forming the second mesogen layer further includes:
   curing the first compound disposed on the second alignment film to form a third cured layer; and
   curing the second compound disposed on the third cured layer to form a fourth cured layer.

6. The method of claim 3, wherein the first compound is represented by the following Chemical Formula 3 and the second compound is represented by the following Chemical Formula 4, wherein Chemical Formula 3 and

Chemical Formula 4

7. The method of claim 3, wherein the first compound is represented by the following Chemical Formula 3 and the second compound is represented by the following Chemical Formula 5, wherein Chemical Formula 3 and

Chemical Formula 5

8. The method of claim 3, wherein the first compound is represented by the following Chemical Formula 3 and the second compound is represented by the following Chemical Formula 6, wherein Chemical Formula 3 and

Chemical Formula 6

9. The method of claim 3, wherein the first compound is represented by the following Chemical Formula 6 and the second compound comprises at least one selected from the group consisting of the compounds represented by the following Chemical Formulas 4, 5, 7 and 8, wherein Chemical Formula 4

-continued

Chemical Formula 5

Chemical Formula 6

Chemical Formula 7 and

Chemical Formula 8

10. The method of claim 3, wherein a weight ratio of the first compound to the second compound in the liquid crystal compound is about 20:80 to about 70:30 based on the total weight of the reactive mesogens.

11. The method of claim 1, wherein the pixel electrode includes a microslit pattern and the common electrode layer is disposed on substantially an entire surface of the second substrate.

12. The method of claim 1, wherein the first and the second mesogen layers respectively include a polymer formed from polymerization of the reactive mesogens.

13. An liquid crystal display panel, comprising:
a first substrate which includes a pixel electrode electrically connected to a switching element arranged in a pixel area of a first base substrate, a first alignment film disposed on the pixel electrode and a first mesogen layer formed on the first alignment film;
a second substrate which includes a common electrode layer facing the first substrate and disposed on the second base substrate, a second alignment film disposed on the common electrode layer and a second mesogen layer formed on the second alignment film; and
a liquid crystal layer which includes a liquid crystal compound interposed between the first substrate and the second substrate,
wherein each of the first mesogen layer and the second mesogen layer include:
a lower cured layer formed by polymerizing a first compound selected from the group consisting of compounds represented by at least one of the following Chemical Formulas 1 and 2; and an upper cured layer formed on the lower cured layer, wherein the upper cured layer being formed by polymerizing a second compound selected from the group consisting of compounds represented by at least one of the following Chemical Formulas 1 and 2, the second compound being different from the first compound, wherein Chemical Formula 1 wherein in Chemical Formula 1, A and B are each independently selected from the group consisting of and and
wherein at least one hydrogen atom of a naphthalene group is independently replaceable with at least one of F and Cl; and Chemical Formula 2 wherein in Chemical Formula 2, D is selected from at least one of

, and a single bond,
wherein E and G are each independently selected from at least one of and and
wherein at least one hydrogen atom of a phenyl group are independently replaceable with at least one of F and Cl.

14. The liquid crystal display panel of claim 13, wherein the second compound has a second light reaction speed and the first compound has a first light reaction speed and wherein the second light reaction speed is relatively slower than the first light reaction speed.

* * * * *